United States Patent [19]

Hansen

[11] Patent Number: 5,690,018
[45] Date of Patent: Nov. 25, 1997

[54] APPARATUS FOR HEAT TREATMENT OF A PARTICULAR FOOD PRODUCT

[76] Inventor: Ejner Bjorn Hansen, Pedarstrupvej 9, DK-5210 Odense NV, Denmark

[21] Appl. No.: 640,832

[22] PCT Filed: Nov. 15, 1994

[86] PCT No.: PCT/DK94/00431

§ 371 Date: Jul. 15, 1996

§ 102(e) Date: Jul. 15, 1996

[87] PCT Pub. No.: WO95/13734

PCT Pub. Date: May 26, 1995

[30] Foreign Application Priority Data

Nov. 19, 1993 [DK] Denmark ................... 1306/93

[51] Int. Cl.⁶ ............... A47J 37/00; A47J 37/04; F24C 7/00; F24C 15/16
[52] U.S. Cl. ............... 99/330; 99/357; 99/407; 99/408; 99/427; 99/451; 99/476; 99/DIG. 14; 55/220; 55/DIG. 36; 126/21 A; 126/299 R
[58] Field of Search ............... 99/330–334, 426, 99/427, 357, 451, 467–476, 403–410, DIG. 14; 126/21 A, 299 R, 300, 299 D; 219/400, 401, 389; 55/220, 242, 280, 269, 279, 228, 467, 511, DIG. 31, DIG. 36; 96/58, 142, 112, 138; 210/167, 232, 540, 513, DIG. 8

[56] References Cited

U.S. PATENT DOCUMENTS

| | | | |
|---|---|---|---|
| 3,783,854 | 1/1974 | Hurko et al. | 126/21 R |
| 4,165,620 | 8/1979 | Kiesel | 99/357 X |
| 4,331,124 | 5/1982 | Seidel et al. | 126/21 A |
| 5,046,481 | 9/1991 | Warwick | 126/522 |
| 5,083,505 | 1/1992 | Kohlstrung et al. | 99/476 X |
| 5,203,256 | 4/1993 | Mueller | 99/475 |
| 5,311,930 | 5/1994 | Bruenn | 126/301 X |
| 5,315,919 | 5/1994 | Hoeberigs | 99/476 |
| 5,339,726 | 8/1994 | Poulson | 99/327 |
| 5,417,148 | 5/1995 | Cavallo | 99/334 |
| 5,419,239 | 5/1995 | Covington et al. | 99/357 |
| 5,445,073 | 8/1995 | Gilwood | 99/427 |
| 5,579,681 | 12/1996 | Ubert et al. | 99/427 |

FOREIGN PATENT DOCUMENTS

| | | |
|---|---|---|
| 2401387 | 3/1979 | France . |
| 9310698 | 6/1993 | WIPO . |

*Primary Examiner*—Timothy F. Simone
*Attorney, Agent, or Firm*—Cushman Darby & Cushman, IP Group of Pillsbury Madison & Sutro LLP

[57] ABSTRACT

An apparatus (1) for use in heat treatment of for example French fried potatoes (10). This process takes place in a treatment chamber (3) where the product is exposed to intensive heat radiation from a number of quartz tubes (14) while they constantly are turned by means of a rotating driving wheel (15) with a number of carriers (16) placed along the periphery. Humidity, smoke and smell separated from the product during this process are sucked off by means of a ventilator (17) which leads the polluted air through a filter device (4) via a convector (5) between the treatment chamber (3) and the filter device (4). The whole arrangement is built up into a cabinet (2) which on the top and at the bottom is provided with ventilation openings (26, 27) through which secondary air is flowing for cooling the polluted air flowing through the convector (5). Thereby a heat exchange effect is obtained for reducing the sucked off temperature to an acceptable level before the air reaches the filter device (4). The apparatus has a construction which is compact and environmentally compatible and suitable for preparing for example pre-fried potato pieces into ready French fried potatoes with very low contents of fat.

20 Claims, 6 Drawing Sheets

APPARATUS FOR HEAT TREATMENT OF A PARTICULAR FOOD PRODUCT

BACKGROUND OF THE INVENTION

Field of the Invention

The invention relates to an apparatus for cooking a food product in a cooking chamber. The product is cooked by exposing it to a heat source, and the gasses which the product emits during cooking are drawn out of the apparatus through a ventilator. A filter device is provided for filtering the gasses prior to exhausting them in the open air. An air connection system links the filter device and cooking chamber to dissipate heat through convection.

BACKGROUND INFORMATION

One popular food product is french fried potatoes which in considerable amounts are served in restaurants, fast food shops, cafeterias or from street vendors. French fried potatoes are served either alone as a meal by themselves or in connection with other courses. In any case, there is a demand for french fried potatoes being served freshly heated and crispy. Since french fried potatoes cannot be kept warm and crispy for a long time, the preparation must necessarily take place quickly and easily to transform the raw and possibly pre-processed material into the ready product.

This demand is predominantly met by deep-fat frying, where a basket containing a portion of potato strips is lowered into a pool of melted lard or cooking oil. The lard or the oil is quickly absorbed by the potato strips which thereby are heated and cooked to a crispy and crunchy consistency with an almost brown color, mainly deriving from the caramelizing of the sugar contents of the potato pieces.

When the potato pieces are cooked in this way they will have a fatty or oily content of 30%. Considering the very large amounts of french fried potatoes which are consumed, especially in industrialized countries, this popular food product can be a serious threat to national health. Consuming too much fat will in the long run lead to obesity and associated various diseases.

In order to eliminate these problems various apparatuses have been proposed for cooking low fat pre-processed potatoes. With these apparatuses it is possible to make crispy and tasty french fried potatoes with moderate fatty contents of approximately 6%.

In this way the problem of high fatty content deep-fried potatoes has been relieved, but in deep-frying as well as in more simple apparatus there still remains the problem that the process emits smoke and odors out into the surrounding air to the inconvenience of customers and work staff. Some apparatuses have been supplied with filters for cleaning the air before it reaches the room but these apparatuses have not fully lived up to the demands made.

Moreover, commercial cooking apparatuses must be simple and relatively inexpensive to produce and take up a minimum of space in narrow and limited conditions on the commercial premises. Furthermore, it is also very important that the cooking apparatus be environmentally compatible, which means that the cooking apparatus must be able to function without the serving staff or the customers feeling any unpleasant effects of heat, smoke and odors.

SUMMARY OF THE INVENTION

One new and characteristic way of obtaining this effect and solving the problems in the prior art is to use the air connection passage as a heat convector.

The cooking apparatus according to the present invention is suitable for cooking prefried low fat potato pieces with fatty contents of for example approximately 6%. The potato pieces also contain water which partly has to be removed in order to obtain the crisp and crunch consistency of the potato pieces which is characteristic of french fried potatoes. This means that a successive renewal of the air in the cooking chamber has to take place or else the cooking process will be halted when the air in the cooking chamber becomes saturated with steam.

The air renewal takes place when the ventilator draws air out of the cooking chamber and fresh air is introduced via an opening for the influx of air in the wall of the chamber. In this way an air current is produced so that the air content in the cooking chamber is constantly exhausted and renewed. Prior to exhausting the air from the cooking chamber the air current is passed through the filter device to remove from the air steam, fat, odors and other impurities.

The air temperature in the cooking chamber can reach 250° C. in the final step of the process. Air at such a high temperature could damage the filter device or at least reduce the filter's effectiveness, so that the air would not be filtered satisfactorily. To solve this problem, the air current could be increased in excess of that for the optimum cooking process. However, that would imply extra running expenses for heating the additional air volume. Furthermore, the ventilator, filter and other construction details of the apparatus would have to be increased in size, whereby the apparatus would become clumsy and bulky, and costly to produce.

By using the air connection between the treatment chamber and the filter device as a convector, the air can be cooled down to a temperature best suitable for the filter device. Normally the various components will be built in a cabinet. In the wall of the cabinet it is preferable to construct ventilation holes, as well as over and under where the convector is placed. The updraft of the heated air surrounding the convector will then cause a secondary air current to pass the convector, whereby the primary air current in the convector is cooled down. In the same way the secondary air current can be sent past areas of the wall of the cabinet, in particular the wall which is close to the very hot cooking chamber, so that these areas are cooled and therefore they will not be uncomfortably hot for the persons who are to operate the cooking apparatus.

When the components of the cooking apparatus are built in a cabinet it will be appropriate to construct a lead-in opening to the cooking chamber, with a corresponding door, and a door into the cabinet. By interrelating the two doors with a suitable rod system, they can be made to open and close at the same time. The serving staff will therefore only have to open the outer door of the cabinet to get immediate access to the cooking chamber when it is to be filled with a new portion of potato pieces. The two doors can be hinged in such a way that they lock in the open position so that the product easily and safely can be poured into the cooking chamber.

The convector can be produced in many different ways in accordance with the present invention. It can be produced as a channel with ribs which give the convector a big surface for effective transmission of the primary air current's heat contents to the secondary air which flows past the convector. By a special advantageous construction form the convector can consist of a number of heat-conduction tubes which are placed at intervals side by side in such a way, that the secondary air current can pass between the tubes, which for example can be made of copper or other heat-conduction material.

For cooking the potato pieces, radiant heat can be used to advantage. This is a very intensive form of energy providing a quick and concise heat treatment of the potato pieces with the least possible loss of energy to the surroundings. The radiant heat element can be placed inside the cooking chamber in different ways. For example, the cooking chamber may be a rotating cylinder in which the potatoes during rotation are tumbling between each other and therefore receive uniform heat radiation on all sides. The preferable construction is that the cooking chamber will be stationary, and that the potato pieces will be rotated by rotating a driving wheel with carriers.

The stationary construction of the cooking chamber allows the inlets and outlets and their associated closing mechanisms to be constructed in a simple and reliable manner. The out-let can thus conveniently be constructed permanently in the bottom area of the cooking chamber. In this way, the ready french fried potatoes will automatically fall out under gravitational pull when a sliding damper is pulled away. In this process, the driving wheel continues to rotate, and therefore a complete emptying of the cooking chamber takes place.

The french fried potatoes fall through a chute which is constructed in the cabinet and has an opening at the bottom through which opening a tray for collecting the french fried potatoes can be inserted. The fresh french fried potatoes will immediately after cooking continue to smell, however, the smell will be drawn into the cooking chamber via its air in-let, while the ventilator thereunder will continue to be operating.

BRIEF DESCRIPTION OF THE DRAWINGS

More advantageous characteristics and effects of the invention will be described in more detail below, with reference to the drawings where:

FIG. 4 shows the openings of FIG. 3 closed with the portion of potato pieces under treatment taken in.

DETAILED DESCRIPTION OF THE INVENTION

Figure 1:
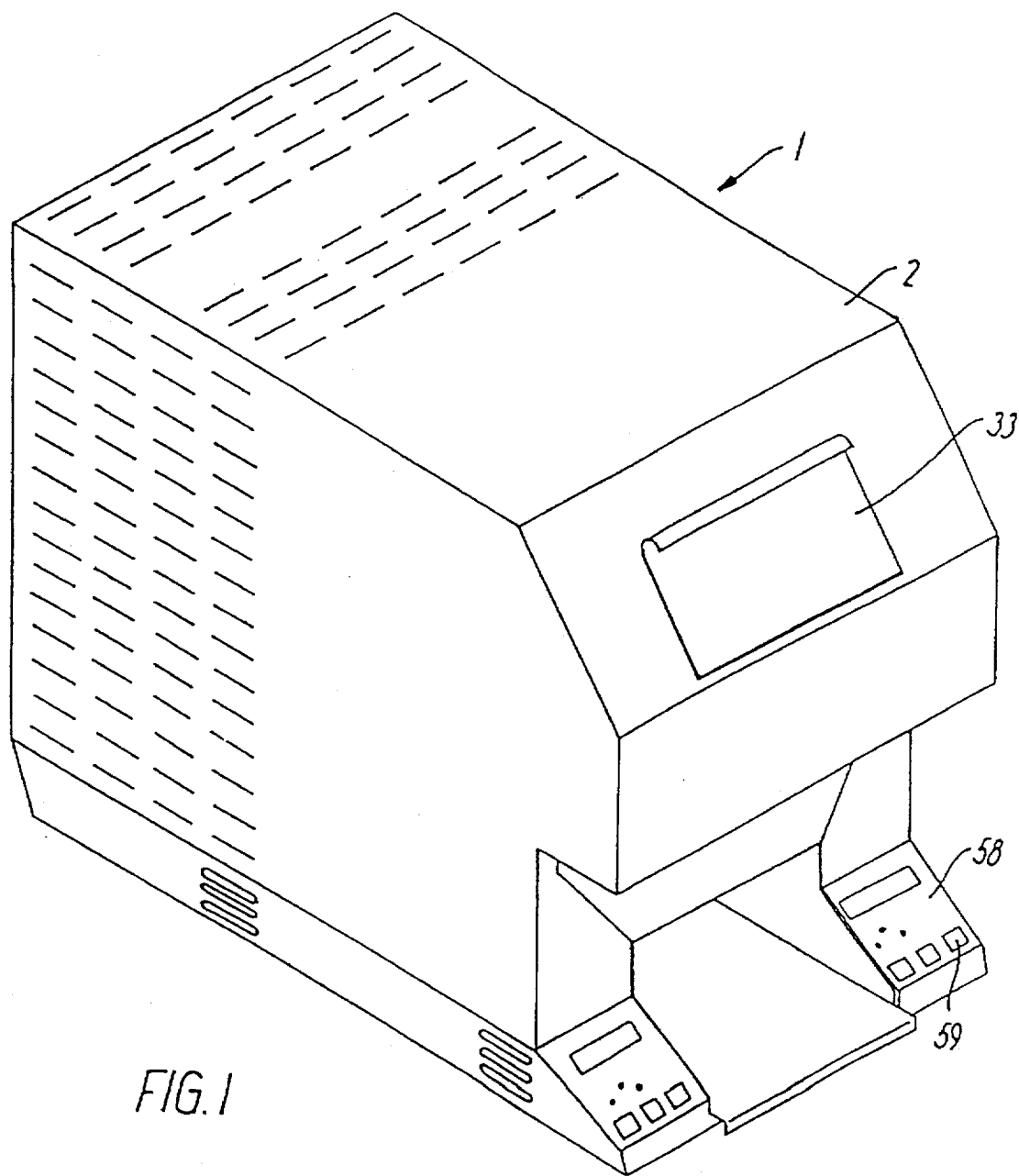
FIG. 1 is a perspective view of an apparatus according to the invention.
Figure 2:
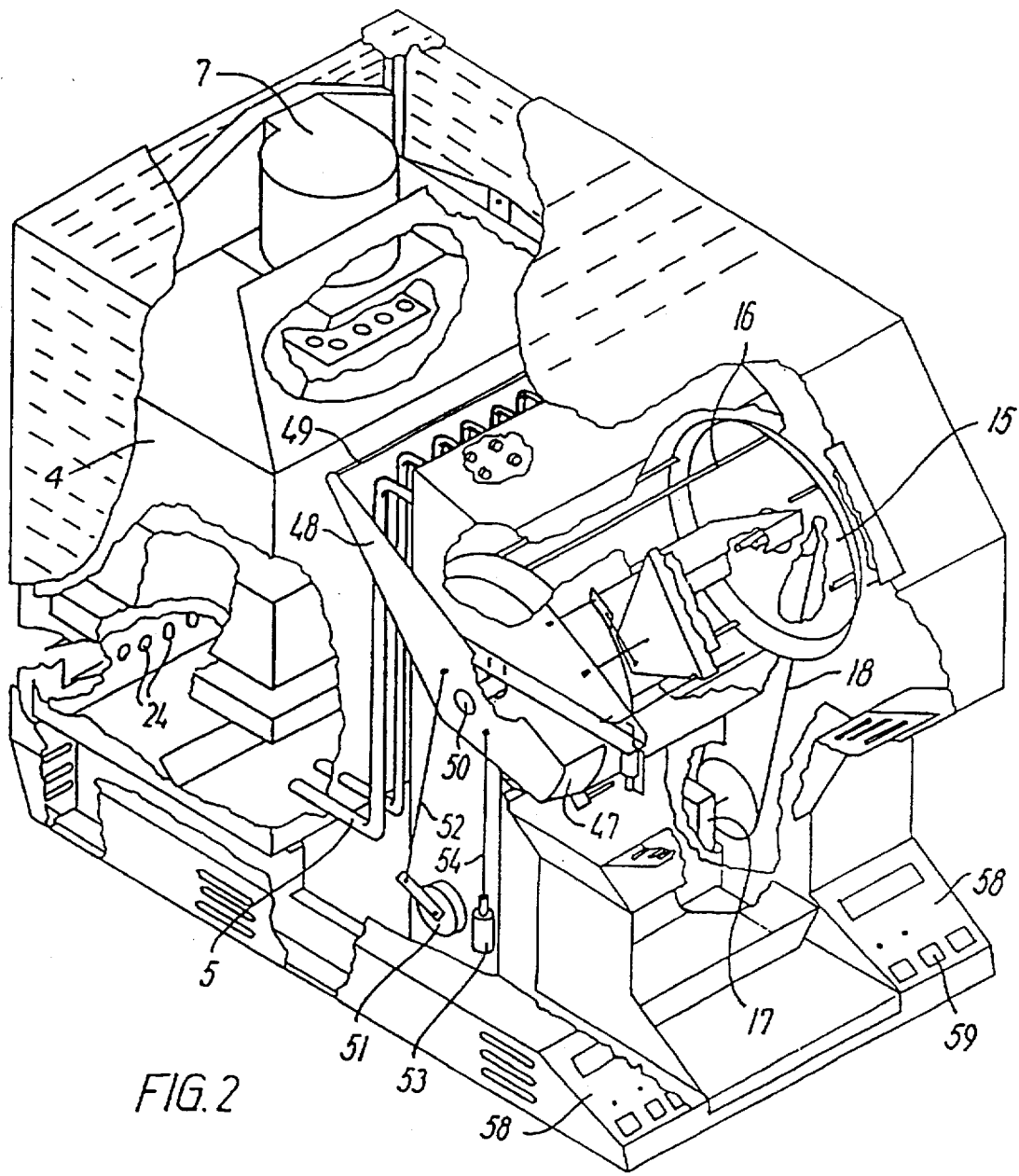
FIG. 2 is a cut away view of the apparatus showing the internal construction.

FIG. 1 shows the cooking apparatus according to the present invention at reference number 1 as having outer cabinet 2. FIG. 2 shows part of the cabinet removed to display interior components. The construction is also shown schematically in the vertical long view in FIGS. 3, 4 and 5. The main components of the cooking apparatus are cooking chamber 3, filter device 4 and a number of copper tubes 5, which form an air connection between the cooking chamber and the inlet of the filter device. The copper tubes 5 also function as a convector, the importance of which will be explained in detail below.

In the wall of cooking chamber 3, opposite to the connection of copper tubes 5, air in-let opening 6 is formed. The discharge end of filter device 4 is, in the embodiment shown, placed on top where ventilator 7, via filter device 4 and copper tubes 5, draws out the air from cooking chamber 3.

Figure 4:
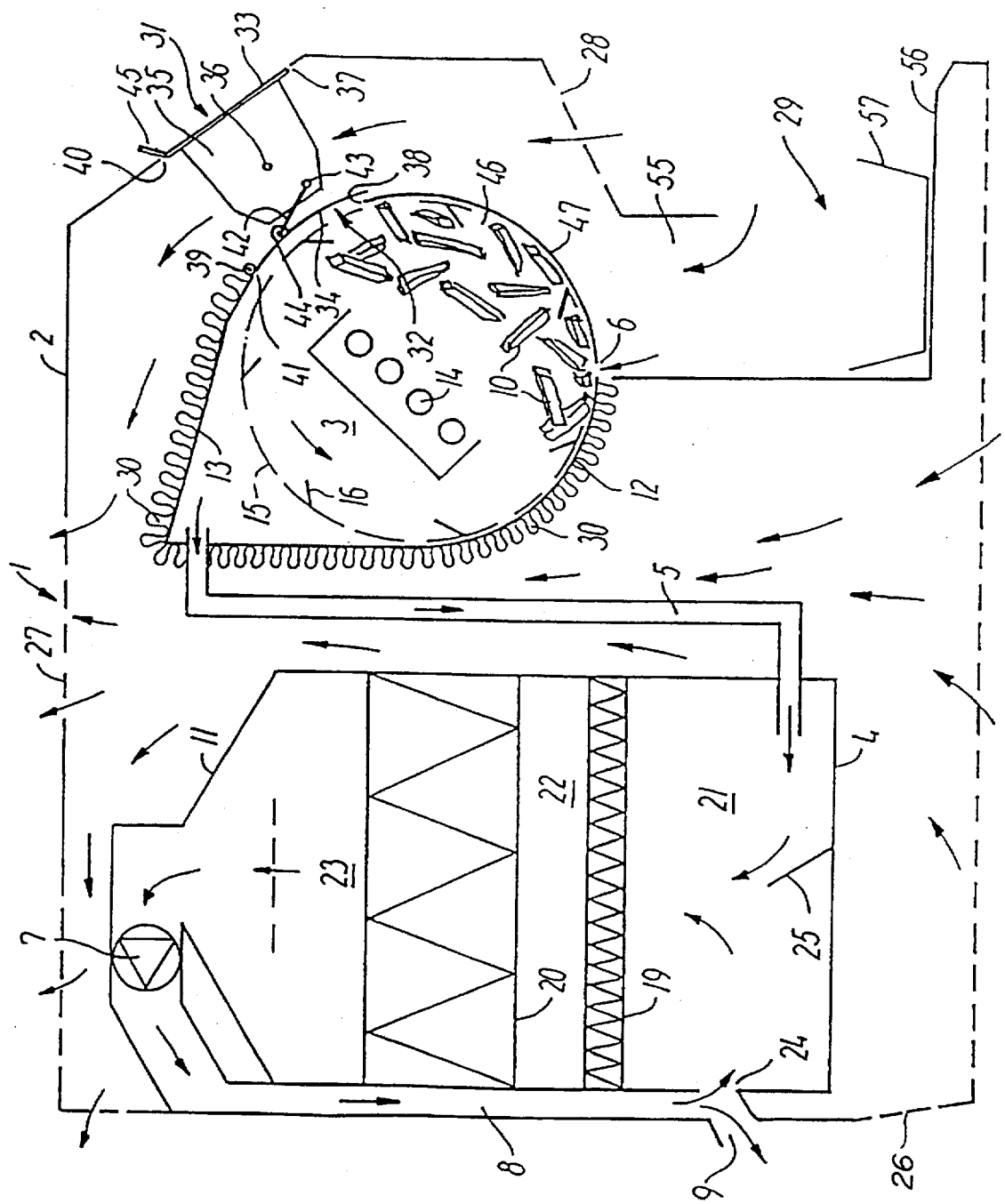

FIG. 4 shows the situation where a portion of potato pieces have been introduced to cooking chamber 3 for cooking. Because ventilator 7 produces low pressure in cooking chamber 3, fresh air will penetrate through air in-let opening 6 in replacement of the air drawn out. Thus, a primary air stream is produced which is exhausted into the open air through a vertical air discharging pipe turning downwards.

The cooking chamber is limited at the bottom by cylindrical jacket 12. As shown in cross section, cylindrical jacket 12 is formed with a pointed cap 13 at its upper end, from which the air in the cooking chamber is drawn out through copper tubes 5. In the cooking chamber are also placed a number of quartz lamps 14 which provide infra-red radiant heat for cooking potato pieces 10. Potato pieces 10 which are pre-fried with fatty contents of approximately 6%, are thereby turned into ready warm and crisp french fried potatoes. To ensure uniform and equal cooking on all sides of potato pieces 10, there has been provided, concentrically to cylindrical cap 12, rotating driving wheel 15 with carriers 16 along its periphery. As best seen from FIG. 2, wheel 15 is driven by motor 17 via chain drive 18. When wheel 15 rotates, potato pieces 10 are constantly being tumbled between one another by carriers 16 so that they are all the time being turned.

The intensive heat radiation from quartz lamps 14 rapidly brings the temperature in cooking chamber 3 up to relatively high degrees, which often will be approximately 250° C. The high temperatures cause potato pieces 10 to give off humidity, fat, odors and other gasses to the air current passing through the chamber. This air current is channeled via copper tubes 5 into filter device 4. Filter device 4 consists of filter housing 11 in which fat filter 19 and smell- and smoke filter 20 are provided. According to the needs there might also be other filters (not shown) built in. Under fat filter 19 there is provided air in-let chamber 21, between filters 19 and 20 there is provided middle chamber 22 and over top of smell- and smoke filter 20 there is provided air out-let chamber 23.

The filter device serves the purpose of exhausting the now purified air within the chamber into the open air. To further purify the air there is provided in the wall of air in-let chamber 21, opposite to air out-let canal 8 and 9, a number of intake openings 24. As a result of the low pressure in air in-let chamber 21, part of the air out-let canal 8 will be drawn in once more through inlet ports 24 and be subject to yet another cleaning by re-circulation through the filter device. This is especially advantageous for the more heavy and slowly running pollution, if any, of humidity and fat which are inclined to be sucked in crosswise of the main air current. An air deflection plate 25, which is placed level with the copper tubes 5 entry to in-let chamber 21 serves to upwardly deflect the air up against fat filter 19, instead of towards in-let port 24.

During the cooking of potato pieces 10 in the cooking chamber 3, the temperature, as mentioned earlier, might rise to approximately 250° C. In the long run the filter device cannot withstand the continuous flow of hot air at this temperature, and will at minimum have a reduced effectiveness so that the exhausted air will not be satisfactorily filtered. Thus, fat filter 19 will only to a limited extent be able to retain the very hot fat steams, which fat steams will be inclined to block up the following smell- and smoke filter 20, thereby degrading the operation of filter device 4. By significantly increasing the air flow volume the air temperature could be lowered to an acceptable level, but this would result in the ventilator, filter device and other components being dimensioned according to this heavily increased air current. Accordingly, the whole apparatus would be out of proportion to the costs for heating the air current and the disadvantages, if any, from the very hot air being expelled into the open air.

The present invention is designed to limit the air flow volume to precisely the amount which is necessary to obtain optimum performance of the heating treatment process, including the removal of the necessary humidity from the potato pieces. The ventilator therefore is dimensioned to be able to draw out exactly this volume of air in breaking down the combined flow resistance through the apparatus. This flow resistance can be adjusted by dimensioning air in-let port 6 by means of an adequately small cross section so that the air throttles passing the port.

Thus the air volume is limited to that absolutely necessary flowing from cap 13 to air in-let chamber 21 via copper tubes 5. In return the air has been heated to a maximum in the cooking chamber. To prevent the heated air from reaching filter device 4 in this very hot, and consequently damaging condition, the air connection between the chamber 3 and filter device 4—in this case by means of copper tubes 5—is constructed as a convector giving off heat from the flowing air to the surroundings. In order to remove this heat from the cabinet, under copper tubes 5 there is constructed a pair of lower ventilation holes 26, and over copper tubes 5 a pair of upper ventilation holes 27. The copper tubes 5 give off heat to the surrounding air, which due to the natural updraft, will rise about copper tube 5 as shown by the arrows in FIG. 4, and come out above upper ventilation holes 27, while new fresh air will flow into lower ventilation holes 26. This secondary air current will, together with the primary air current in copper tubes 5, work as a kind of heat exchanger cooling the air in the primary air current down to an acceptable level before it reaches filter device 4.

In the front of the cabinet, under cooking chamber 3, there is furthermore constructed another pair of ventilation in-lets 28 and out-let 29 for removing the ready french fried potatoes. As shown, cooking chamber 3 is placed at a distance behind cabinet 2. In the space formed in front of cooking chamber 3 the air will be heated whereby another secondary air current will arise flowing in the direction of the arrows through in-lets 28, 29, through the space and coming out on the top through upper ventilation in-lets 27. This other secondary air current serves the purpose of cooling down the front part of the cabinet preventing it from becoming too hot to touch by the serving staff. Also to prevent the cabinet from getting too hot and also for energy-economic reasons, cooking chamber 3, along its outer side, is provided with heat-insulating material 13 in the areas where it practically can be done.

During the cooking process, halogen lamps 14 are a source of heat and in very short time they produce intensive heat. The temperature will become very high, for example about 250° C. The concentrated heat energy of the cooking chamber 3 must necessarily be let out into the surrounding air at the same speed as it is produced. This is a significant element of the present invention, that the operation of the device takes place in an environmentally compatible way, that means without inconvenience to serving staff or to customers. This is accomplished in a simple and inexpensive way be means of the entire air flow of the apparatus, where the primary air current together with the first and secondary air currents, as shown by the arrows in FIGS. 3, 4 and 5, distribute the concentrated heat energy in cooking chamber 3 along with the main part of the surface of the cabinet, resulting in a heavily reduced air temperature. The secondary air currents which to a high extent are contributing to this surprisingly advantageous effect, are driven by the waste heat itself deriving from the cooking process, and therefore do not require any supplemental energy supply.

Figure 3:
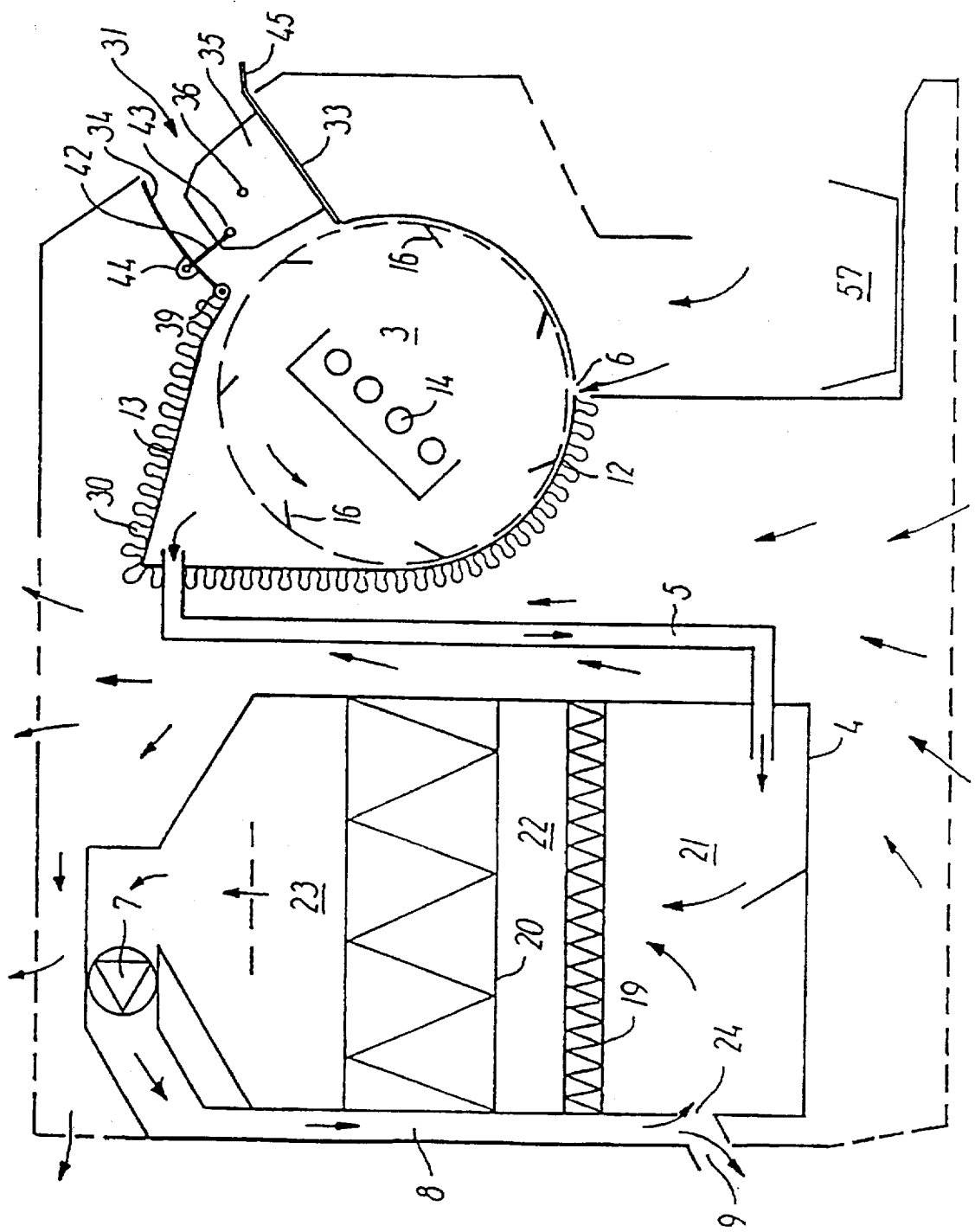
FIG. 3, a schematic of the apparatus shown in FIGS. 1 and 2, illustrating the openings for introducing a portion of fresh potato pieces for treatment.

First in-let opening 31 and an opposite second in-let opening 32 in cooking chamber 3 are provided for introducing potato pieces to the apparatus. The first opening 31 can be closed with first pivoting door 33 and second opening 32 with second pivoting door 34. The first door 33 is U-shaped with side flaps side 35. Each of these side flaps 35 are suspended on pivots 36 which are placed on separate rigid brackets (not shown) in the cabinet. The pivots 36 are placed at equal distance from the lower edges of the two in-let openings 37, 38 and therefore, as shown in FIG. 3, in open position they will build a bridge between the two edges 37, 38. The door 33 will then lay as a chute under the potato pieces, which are introduced to cooking chamber 3.

Figure 5:
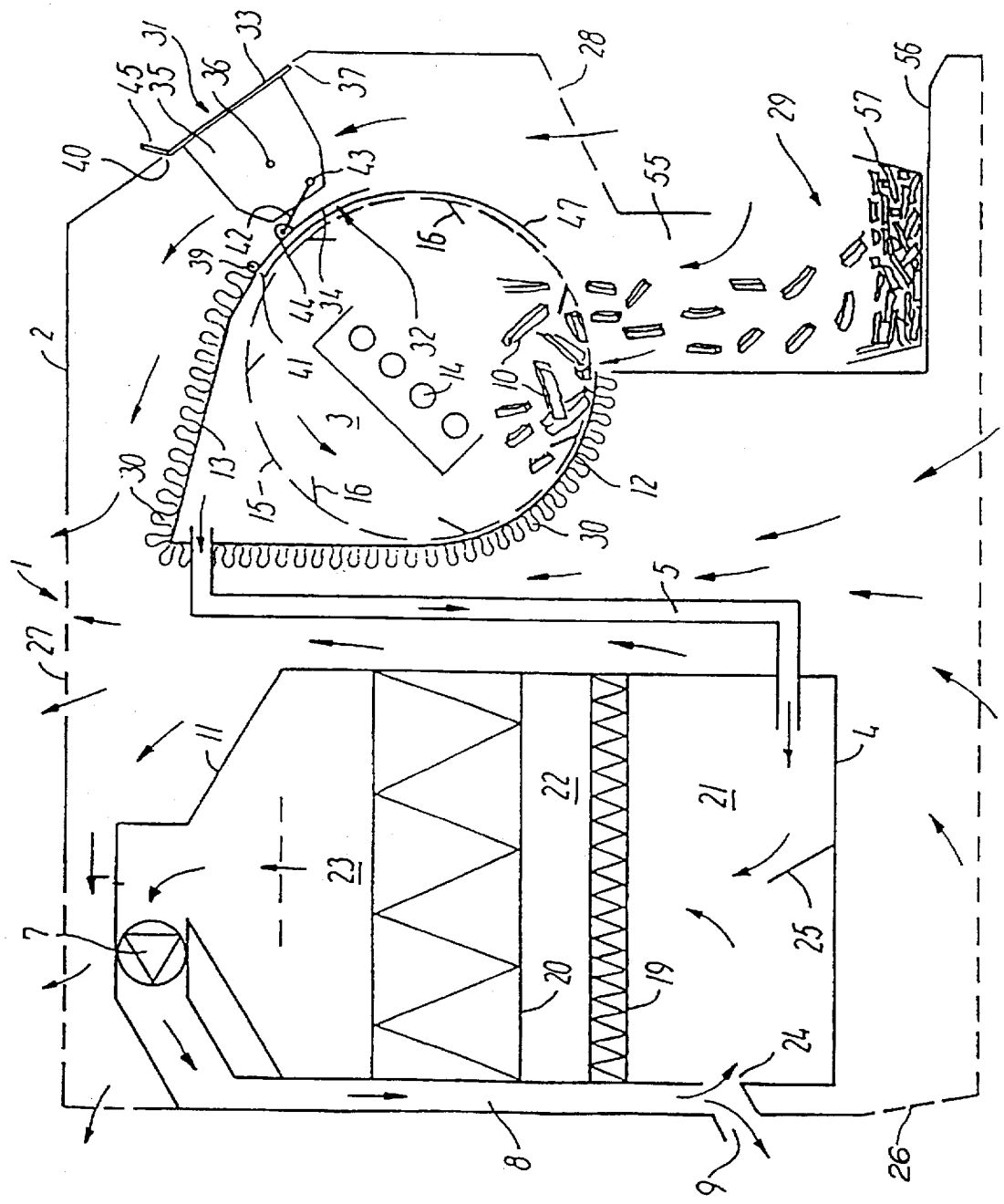
FIG. 5 illustrates the opening for dumping out the ready french fried potatoes onto a tray under the opening, and FIGS. 6a–6c schematically show a mechanism for opening the out-let which is shown in three different positions.

The second door 34 can turn around a top hinge from a closed position, as shown in FIGS. 4 and 5, to an open position, as shown in FIG. 3, where the door builds a bridge between the in-let openings upper edges 40 and 41 and thereby forms a ceiling over the chute, made by the first door. In this way the doors will, in open position, together form an in-let feeder providing a convenience and safe fall for a portion of potato pieces in cooking chamber 3, without greatly risking that any of the potato pieces will fall outside or remain inside the cabinet.

The two doors 33, 34 are articulated with arms 42, one end of which is suspended on pivot 43 placed on the flap of the first door and the second end of which is suspended on pivot 44 placed on the second door. The articulation is constructed in such a way that the two doors are forced to follow the opening- and closing movements of one another. Both doors will consequently be open at the same time, as shown in FIG. 3, and closed at the same time, as shown in FIGS. 4 and 5. For activating the door, handle 45 is provided on the upper part of first door 33.

At its lower part, cooking chamber 3 has discharge opening 46 which can be closed with slide gate 47, located concentricity with the axis of the chamber. Slide gate 47 can pivotally shift from the closed position, as shown in FIGS. 3 and 4, to the open position, as shown in FIG. 5.

Figure 6A:
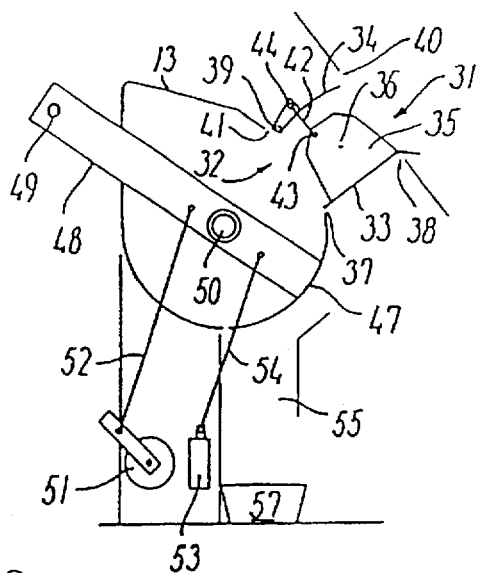
Figure 6B:
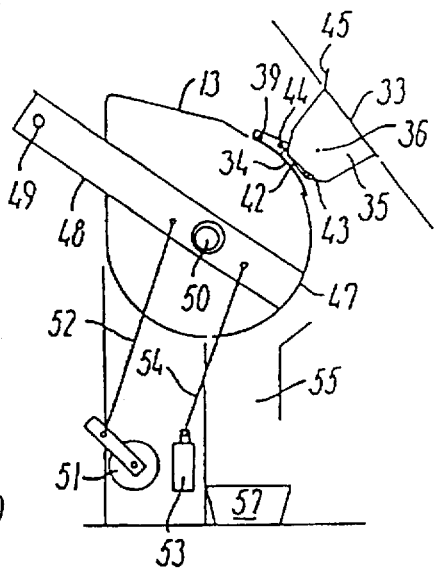
Figure 6C:
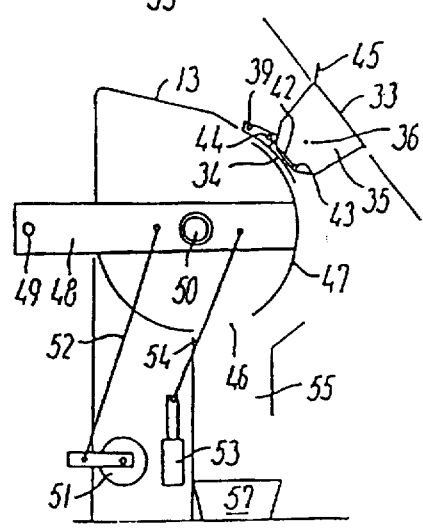

While the in-let openings are meant to be handled manually slide gate 47 will automatically be opened and closed after each working cycle by a turning mechanism built for this purpose. The mechanism is shown in FIGS. 6a, b and c which show the slide gate in closed position (FIG. 6a, b), open position (FIG. 6c) and also the position of in-let openings 33, 34 at the same time. The mechanism consists of, as shown in FIG. 2, two lever arms 48 which are placed on each side of cooking chamber 3. The rear ends of lever arms 48 are connected to rod 49 and the fore ends to slide gate 47, and they can turn around shaft 50 the axis of which is congruent to the axis of cooking chamber 3. A turning magnet 51 is connected via a rod or wire to lever arms 48 at a distance behind shaft 50, and counter weight 53 is connected, via wire 54, to lever arms 48 at a distance in front of shaft 50.

Under discharge opening 46, in cabinet 2, there is provided chute 55 for the cooked french fried potatoes to pass through. The cooked potatoes can be removed through removal opening 29 in the wall of chute 55. At the bottom of chute 55 there is landing 56 on which tray 57 can be placed to collect the cooked product for later serving.

As shown in FIGS. 1 and 2, control panel 58 with pushbuttons 59 is provided on the lower part of the cabinet for activating a working cycle and adjustment of temperatures and process time so that the ready french fried potatoes can be served in exactly the quality demanded by customers.

By activating pushbuttons 59, orders are given to an electronic control unit (not shown) which controls all the functions of the apparatus as well as the whole process.

The apparatus described above is most suitable for quick and effective preparation of pre-fried french fried potatoes in portions containing low fat contents of 6%. These prefried french fried potatoes can for example be packed and frozen in bags, each bag containing 165 grams of french fried potatoes. On the premises where the french fried potatoes are to be prepared, they will be stored in a freezer at a temperature of approximately −18° C., until they are ready to be used.

When the apparatus is not in use, but ready to be used, there will be a temperature in the cooking chamber of approximately 200° C., so no time is wasted in heating up the chamber when a treatment cycle is to begin.

When a customer places an order for french fried potatoes, in-let doors 33, 34, as shown in FIG. 3, are opened and together they form an in-let feeder. In this position the door will block the passage of the second secondary air current through the space between the cooking chamber and the cabinet. The second secondary air current, which can be very hot, is therefore unable to get through the in-let openings and cause injury to the person activating the apparatus. With the ventilator connected, there will be generated an air current over the in-let feeder with a direction towards the cooking chamber, so that smoke or odors from the cooking chamber will not be let out through the in-let openings.

As soon as the doors are open, a portion of deep-frozen, pre-fried french fried potatoes can be easily poured into the cooking chamber through the in-let feeder between the open doors. The existence of the feeder ensures that the potato pieces will not fall outside, and the serving staff therefore will more efficiently operate the system and be able to attend to other tasks or their customers.

Immediately after the potato pieces have been poured into the cooking chamber, the doors will be closed again, and the apparatus is activated by pressing the respective pushbutton 59. The situation will now be, as shown in FIG. 4, where the actual cooking of the potato pieces takes place and as shown by the arrows, air currents will be generated. As can be seen in FIG. 4, the second secondary air current can now pass in the space between the two closed doors closed so that the outer door 31, will not become so hot that the serving staff will burn their fingers in handling the door.

The apparatus according to the invention operates to prepare pre-fried, deep-frozen french fried potatoes in typically about 3 minutes in accordance with the following process steps.

1. 0–60 sec.

The deep-frozen, french fried potatoes are thawing and the temperature will rise to approximately 120° C. Some water will be set free.

2. 60–120 sec.

The temperature will rise to approximately 250° C. Some steam will be set free, and there will be built up a skeleton of starch which at this temperature will coagulate. A slight brownish color will appear caused by the french fried potatoes' sugar contents being caramelized. The oil has reached its smoking point at approximately 190°–200° C. A slight smell and smoke can occur.

3. 120–180 sec.

The actual roasting/combustion where the temperature will rise to approximately 250° C. has now begun. After having separated water and building up the skeleton, a final browning and drying of the french fried potatoes takes place, whereby they will obtain their characteristic appearance and crisped and crunchy consistency. Humidity and smoke are in the process drawn out from the chamber, while replacement fresh air is flowing in through the air in-let opening in the wall of the chamber.

The electronical control unit (not shown) controls the total time progress and adjusts the cooking time process. It also activates turning magnet 51 which thereby turns slide gate 47 and opens discharge opening 46. This situation is shown in FIG. 5. While driving wheel 15, with carriers 16, continues to rotate, the ready french fried potatoes will fall down through chute 55 onto tray 57 which has been placed on landing 56. During this operation ventilator 7 keeps operating whereby a heavy air current will rise up through the chute and into the cooking chamber, as long as slide gate 47 is open. This makes it possible to prevent smoke and odors from coming out into the surrounding air from the cooking chamber, and at the same time the remaining odors from the hot french fried potatoes are drawn out together with the air current into the cooking chamber. The rotating driving wheel will sweep the last french fried potatoes out through the opening of the cooking chamber, and then the opening will close again according to a time schedule adjusted beforehand. The electronic control unit controls turning magnet 51 so as to close slide gate 47.

In only approximately 3 minutes an order of fresh, hot french fried potatoes can be served from tray 57.

If additional orders are required, then the cycle repeats itself. If no new orders are needed, the apparatus will automatically return to the ready position and the ventilator will stop, but with adequate activation of the halogen lamps to keep the temperature at approximately 200° C. in the cooking chamber.

Accordingly, french fried potatoes can now, by means of the apparatus according to the present invention, be served as a delicate and healthy food product with low fat content. The preparation takes place with effortless ease with a minimum of working effort from the serving staff.

The apparatus can also with great advantage be used for many other food products. For example, it can be used to prepare chestnuts, roasted onions and grilled meat in squares.

The process uses concentrated heat and just enough air renewal to give the prepared product the flavor and consistency wanted.

The high temperature in the cooking chamber is dissipated by means of a system of low temperature air currents flowing along the surface of the cabinet. The primary air from the cooking process is cooled prior to its entry at the filter device by a secondary air current driven by the waste heat. Therefore the filter device can work efficiently and with high reliability.

The apparatus is safe and environmentally compatible, since the cooking heat is dissipated and the exhausted air is purified. At the same time the apparatus has a compact and space-saving construction.

The apparatus therefore is very suitable to place wherever food products of the above mentioned kind are to be served.

What is claimed is:

1. A cooking apparatus for cooking a food product, said apparatus comprising:

a chamber for receiving the food product to be cooked;

a heat source for applying heat to said chamber;

a ventilator for releasing gases developed within said chamber through an outlet canal to the exterior of the cooking apparatus;

a filter device operatively coupled to said ventilator for purifying the gasses developed within said chamber;

an air connection path between said chamber and said filter device, wherein said air connection path acts as a convector of the heat developed within said chamber.

2. The apparatus of claim 1, said chamber having a wall opposite to the air connection path entrance to said chamber, said wall having at least one air intake opening of adjustable cross section for allowing sufficient air flow for adjusting the cooking temperature within said chamber, said air flow entering said chamber because of a pressure difference between the interior of said apparatus and the ambient air, said pressure difference being created by said ventilator.

3. The apparatus of claim 1, wherein said filter device comprises:

a filter housing;

a plurality of filter elements disposed within said filter housing, said plurality of filter elements being provided for removing at least one of impurities, smoke, fat and odors from the gasses developed in said chamber;

a deflector plate for deflecting gasses received from said air connection path towards at least one of said plurality of filter elements; and an opening through said housing to communicate with said outlet canal.

4. The apparatus of claim 2, wherein said filter device comprises:

a filter housing;

a plurality of filter elements disposed within said filter housing, said plurality of filter elements being provided for removing at least one of impurities, smoke, fat and odors from the gasses developed in said chamber;

a deflector plate for deflecting gasses received from said air connection path towards at least one of said plurality of filter elements; and an opening through said housing to communicate with said outlet canal.

5. The apparatus of claim 1, said chamber, heat source, ventilator, filter device and air connection path being enclosed in a cabinet.

6. The apparatus of claim 2, said chamber, heat source, ventilator, filter device and air connection path being enclosed in a cabinet.

7. The apparatus of claim 3, said chamber, heat source, ventilator, filter device and air connection path being enclosed in a cabinet.

8. The apparatus of claim 4, said chamber, heat source, ventilator, filter device and air connection path being enclosed in a cabinet.

9. The apparatus of claim 5, said cabinet having a plurality of ventilation holes.

10. The apparatus of claim 6, said cabinet having a plurality of ventilation holes.

11. The apparatus of claim 7, said cabinet having a plurality of ventilation holes.

12. The apparatus of claim 8, said cabinet having a plurality of ventilation holes.

13. The apparatus of claim 1, said chamber having a gate at its bottom surface, said gate having an open position and a closed position, the cooked food product being removed from said chamber when said gate is in said open position.

14. The apparatus of claim 2, said chamber having a gate at its bottom surface, said gate having an open position and a closed position, the cooked food product being removed from said chamber when said gate is in said open position.

15. The apparatus of claim 3, said chamber having a gate at its bottom surface, said gate having an open position and a closed position, the cooked food product being removed from said chamber when said gate is in said open position.

16. The apparatus of claim 5, said chamber having a gate at its bottom surface, said gate having an open position and a closed position, the cooked food product being removed from said chamber when said gate is in said open position.

17. The apparatus of claim 5, wherein said cabinet and chamber have first and second doors, respectively, which connect to each other so that said first and second doors are both open or closed at the same time, the food product to be cooked being placed into the chamber through said first and second doors.

18. The apparatus of claim 9, wherein said cabinet and chamber have first and second doors, respectively, which connect to each other so that said first and second doors are both open or closed at the same time, the food product to be cooked being placed into the chamber through said first and second doors.

19. The apparatus of claim 13, wherein said cabinet and chamber have first and second doors, respectively, which connect to each other so that said first and second doors are both open or closed at the same time, the food product to be cooked being placed into the chamber through said first and second doors.

20. The apparatus of claim 1, said heat source comprising a plurality of quartz lamps and said chamber being rotatable to ensure uniform cooking of the food product.

* * * * *